(12) United States Patent
Lyon et al.

(10) Patent No.: US 9,754,238 B2
(45) Date of Patent: Sep. 5, 2017

(54) WAREHOUSE MANAGEMENT SYSTEM

(71) Applicant: HOJ ENGINEERING AND SALES CO., INC., Salt Lake City, UT (US)

(72) Inventors: Robert Glen Lyon, Bluffdale, UT (US); Clinton Furse, Riverton, UT (US)

(73) Assignee: Hoj Engineering & Sales Co., Inc., Salt Lake City, UT (US)

( * ) Notice: Subject to any disclaimer, the term of this patent is extended or adjusted under 35 U.S.C. 154(b) by 916 days.

(21) Appl. No.: 13/717,437

(22) Filed: Dec. 17, 2012

(65) Prior Publication Data

US 2013/0211977 A1 Aug. 15, 2013

Related U.S. Application Data

(60) Provisional application No. 61/577,979, filed on Dec. 20, 2011.

(51) Int. Cl.
*A01K 5/02* (2006.01)
*G06F 17/50* (2006.01)
(Continued)

(52) U.S. Cl.
CPC ......... *G06Q 10/0875* (2013.01); *G06Q 10/00* (2013.01); *G06F 7/00* (2013.01);
(Continued)

(58) Field of Classification Search
CPC ........ G06Q 10/00; G06Q 30/00; G06Q 10/06; G06Q 10/0631; G06F 7/00; G06F 17/00; G06F 9/46; G06F 19/00

USPC .... 705/7.13–7.16, 22, 28, 29; 235/381–385; 340/10.1, 5.2, 5, 61, 570, 571; 700/95, 700/216
See application file for complete search history.

(56) References Cited

U.S. PATENT DOCUMENTS

| | | | | | |
|---|---|---|---|---|---|
| 4,336,589 | A | * | 6/1982 | Smith | ............... G06Q 10/08 198/418 |
| 5,393,965 | A | * | 2/1995 | Bravman | ........... G06K 7/1486 235/383 |

(Continued)

FOREIGN PATENT DOCUMENTS

| | | |
|---|---|---|
| EP | 1 522 507 A1 | 4/2005 |
| JP | 11-116013 | 4/1999 |

(Continued)

OTHER PUBLICATIONS

Paris, W.F. III;"Automated Warehouse Systems Expedites Medical Resupply to Hospital Department"; Industrial Engineer, Oct. 1998, vol. 20, No. 10, pp. 36-37, 39.

(Continued)

*Primary Examiner* — Olusegun Goyea
(74) *Attorney, Agent, or Firm* — Thorpe North & Western

(57) ABSTRACT

A warehouse management system can include pick platforms, each having an identifier associated therewith. A mobile computing device can be associated with a pick platform based on the identifier and may be associated with one of the pick platforms at a time. A director computing device can be in communication with the mobile computing device and can transmit pick instructions to the mobile computing device based on a currently associated pick platform.

19 Claims, 8 Drawing Sheets

(51) Int. Cl.
  *G06F 19/00* (2011.01)
  *G06Q 10/08* (2012.01)
  *G06Q 10/00* (2012.01)
  *G06F 17/00* (2006.01)
  *G06Q 10/06* (2012.01)
  *G06F 7/00* (2006.01)
  *G06Q 30/00* (2012.01)

(52) U.S. Cl.
  CPC ............ *G06F 17/00* (2013.01); *G06F 19/00* (2013.01); *G06Q 10/06* (2013.01); *G06Q 10/0631* (2013.01); *G06Q 30/00* (2013.01)

(56) References Cited

U.S. PATENT DOCUMENTS

| | | | | |
|---|---|---|---|---|
| 5,395,206 | A * | 3/1995 | Cerny, Jr. | B65G 1/1378 414/270 |
| 5,812,986 | A | 9/1998 | Danelski | |
| 5,853,181 | A | 12/1998 | Booras | |
| 5,877,962 | A | 3/1999 | Radcliffe | |
| 5,934,864 | A | 8/1999 | Lyon et al. | |
| 5,953,234 | A | 9/1999 | Singer et al. | |
| 6,721,762 | B1 * | 4/2004 | Levine | G06Q 10/04 |
| 6,762,382 | B1 | 7/2004 | Danelski | |
| 6,762,681 | B1 * | 7/2004 | Danelski | B65G 1/137 340/5.2 |
| 6,775,588 | B1 | 8/2004 | Peck | |
| 6,847,861 | B2 * | 1/2005 | Lunak | B65G 1/12 221/2 |
| 6,876,902 | B2 | 4/2005 | Nikolich | |
| 6,876,958 | B1 * | 4/2005 | Chowdhury | G06Q 10/04 414/801 |
| 7,040,541 | B2 * | 5/2006 | Swartz | G06K 17/00 235/462.46 |
| 7,077,318 | B2 | 7/2006 | Venema et al. | |
| 7,139,637 | B1 | 11/2006 | Waddington | |
| 7,155,166 | B2 * | 12/2006 | Swan | G06Q 10/087 340/572.1 |
| 7,158,856 | B2 | 1/2007 | Sheehan et al. | |
| 7,258,241 | B2 | 8/2007 | Reid | |
| 7,504,949 | B1 * | 3/2009 | Rouaix | G06Q 10/06 235/375 |
| 7,516,848 | B1 | 4/2009 | Shakes | |
| 7,667,148 | B2 | 2/2010 | Mansfield et al. | |
| 7,853,492 | B1 * | 12/2010 | Kirklin | G06Q 10/087 280/79.2 |
| 7,865,263 | B2 | 1/2011 | Spano, Jr. et al. | |
| 7,865,398 | B2 * | 1/2011 | Schon | G06Q 10/08 705/22 |
| 7,945,455 | B2 | 5/2011 | Zimmermann | |
| 8,055,377 | B2 * | 11/2011 | Yair | G06Q 10/08 414/273 |
| 9,043,235 | B1 | 5/2015 | Sacks | G06Q 10/087 235/462.45 |
| 2001/0030232 | A1 * | 10/2001 | Piatek | G06Q 10/08 235/375 |
| 2002/0059121 | A1 * | 5/2002 | Schneider | G06Q 10/08 705/28 |
| 2002/0087231 | A1 | 7/2002 | Lewis et al. | |
| 2002/0115341 | A1 * | 8/2002 | Hein | H01R 25/14 439/495 |
| 2002/0165639 | A1 * | 11/2002 | England | G06Q 10/00 700/216 |
| 2003/0155731 | A1 * | 8/2003 | Ditges | B62B 3/006 280/47.35 |
| 2003/0233165 | A1 * | 12/2003 | Hein | G06Q 10/087 700/216 |
| 2004/0024730 | A1 | 2/2004 | Brown et al. | |
| 2004/0181467 | A1 * | 9/2004 | Raiyani | G06Q 10/087 705/28 |
| 2004/0188523 | A1 * | 9/2004 | Lunak | B65G 1/12 235/385 |
| 2004/0188524 | A1 * | 9/2004 | Lunak | B65G 1/12 235/385 |
| 2004/0217564 | A1 * | 11/2004 | Ditges | B62B 3/006 280/79.3 |
| 2004/0243278 | A1 * | 12/2004 | Leishman | G06Q 10/087 700/214 |
| 2005/0071234 | A1 * | 3/2005 | Schon | G06Q 10/08 705/22 |
| 2005/0103842 | A1 * | 5/2005 | Bong | G06Q 10/087 235/385 |
| 2005/0230472 | A1 * | 10/2005 | Chang | G06Q 20/343 235/383 |
| 2006/0020366 | A1 | 1/2006 | Bloom | |
| 2006/0025883 | A1 * | 2/2006 | Reeves | G06Q 10/08 700/216 |
| 2006/0054692 | A1 * | 3/2006 | Dickey | C08F 10/00 235/385 |
| 2006/0255951 | A1 * | 11/2006 | Roeder | B62B 3/06 340/572.7 |
| 2007/0067200 | A1 * | 3/2007 | Patel | G06Q 10/06 705/7.14 |
| 2007/0129830 | A1 * | 6/2007 | Kokuryo | G06Q 10/06 700/95 |
| 2007/0142961 | A1 | 6/2007 | Bhasin | |
| 2008/0167884 | A1 * | 7/2008 | Mountz | G06Q 10/087 705/29 |
| 2008/0183324 | A1 | 7/2008 | Krisnamuthi et al. | |
| 2008/0183326 | A1 | 7/2008 | Danelski | |
| 2008/0183327 | A1 | 7/2008 | Danelski | |
| 2008/0183328 | A1 | 7/2008 | Danelski | |
| 2008/0215179 | A1 * | 9/2008 | Yair | G06Q 10/087 700/215 |
| 2008/0316045 | A1 | 12/2008 | Sriharto et al. | |
| 2009/0152345 | A1 * | 6/2009 | Johnson | G06Q 10/06 235/381 |
| 2010/0057245 | A1 * | 3/2010 | Hironaka | G06Q 10/08 700/214 |
| 2010/0175965 | A1 | 7/2010 | Fukuda | |
| 2010/0316468 | A1 * | 12/2010 | Lert | B65G 1/045 414/273 |
| 2010/0324959 | A1 * | 12/2010 | Templeton | G06Q 10/08 705/334 |
| 2011/0320320 | A1 * | 12/2011 | Dearlove | G06Q 10/08 705/27.1 |
| 2012/0029962 | A1 * | 2/2012 | Podgurny | G06Q 10/06 705/7.13 |
| 2012/0330458 | A1 * | 12/2012 | Weiss | B66F 9/063 700/216 |

FOREIGN PATENT DOCUMENTS

| | | | |
|---|---|---|---|
| JP | 2002187605 | A * | 7/2002 |
| JP | 2003321111 | A * | 11/2003 |
| WO | WO 2008/061253 | A2 | 5/2008 |

OTHER PUBLICATIONS

IPTI Innovative Picking Technologies, Inc. "Pick-MAX automated Picking system"; http://ipti.net/pickmaxauto.php.printed on Apr. 3, 2012 (1 Page).

IPTI Innovative Picking Technologies, Inc.; www.ipti.net; printed on Mar. 28, 2012 (1 page).

Levine, R.; "Wireless warehousing—using Proxim's Proxim RangeLAN2 wireless LAN/WAN system—Company Operations; FindArticles/Technology/Communications News"; Dec. 1999, 3 pages.

Raiyani, S. et al.; "Multimodal Warehouse Applications"; ACM, 2006, 3 pages.

Modern Materials Handling; Picking strategies that spell success: Having the right picking system for your operation will reduce cost and get orders to customers quickly. (design plans & ideas); Modern Materials Handling; Jul. 2002 (retrieved from internet Dec. 11, 2016; 7 pages; vol. 57(8), d5(12); Reed Business Information Inc.; United States; Retrieved from http://dialog.proquest.com/professional/docview/678322493?accountid=142257.

(56) References Cited

OTHER PUBLICATIONS

Modern Materials Handling; Seiko doubles pick rates with real-time inventory control; Modern Materials Handling; Jan. 1998 (retrieved from internet Dec. 11, 2016; 2 pages; vol. S8; Reed Business Information, Inc.; United States; Retrieved from http://dialog.proquest.com/professional/docview/765701967?accountid=152257.

Walker; Beverage Industry; Warehousing; Jul. 1992 (retrieved from internet Dec. 11, 2016; 4 pages; vol. 15; BNP Media; Retrieved from http://dialog.proquest.com/professional/docview/671383407?accountid=142257.

* cited by examiner

WAREHOUSE MANAGEMENT SYSTEM

PRIORITY CLAIM

This application claims the benefit of U.S. Provisional Application Ser. No. 61/577,979 filed on Dec. 20, 2011, the entire contents of which are incorporated herein by reference.

BACKGROUND

Retailers, wholesalers, rental services, and other product distributors (which may collectively be referred to as distributors) often maintain an inventory of various items that may be ordered by clients or customers.

Pickers can be given instructions to go to locations in inventory to pick items from specified locations. Pickers will sometimes utilize RF-connected wireless terminals or hand-held scanners to receive instructions and to correctly pick the desired items. In addition, a picker may scan an item using the wireless terminals to ascertain whether the item is the desired item. In some instances, a mobile cart carrying multiple bins may be provided for the picker to use in picking items for an order. After an item has been picked, the picker can place the item in a desired bin, which may be used, for example, to keep separate orders organized, to keep similar items together, and so forth.

Conventionally, a picker may be instructed to pick items for one order at a time, or to pick items for a batch of orders going to a pick destination (e.g., to a particular automated sorting station, manual sorting station, packing station, or other processing station), or a list of items from various orders going to a particular destination, etc. After a picker picks the items, the picker may deliver the picked items to the pick destination, leaving the processing and sorting of the picked items into their individual orders to the other employees. The process may then be repeated for another list of items.

SUMMARY

In one example of the present technology, a warehouse management system can include pick carts, each having an identifier associated therewith. A mobile computing device can be associated with a pick cart based on the identifier and may be associated with one of the pick carts at a time. A director computing device can be in wireless communication with the mobile computing device and can transmit pick instructions to the mobile computing device based on a currently associated pick cart configuration.

A warehouse management method using a plurality of pick carts in accordance with an example of the present technology can include dissociating a mobile computing device from a first pick cart when the mobile computing device is associated with the first pick cart and associating the mobile computing device with a second pick cart based on an identifier associated with the second pick cart. Pick may be provided for display on the mobile computing device based on a currently associated pick cart configuration.

In accordance with another example of the present technology, a warehouse management system can include pick carts, each having an identifier associated therewith. A mobile computing device can be associated with a pick cart based on the identifier and may be associated with one of the pick carts at a time. Pick instructions for display on the mobile computing device can be provided based on a currently associated pick cart configuration.

DETAILED DESCRIPTION

Figure 1:
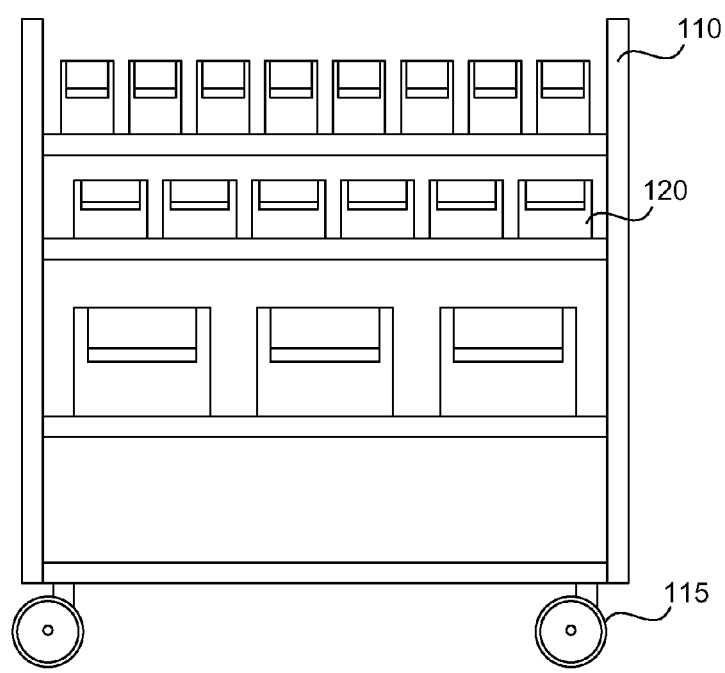
FIG. 1 is a front view of a conventional pick cart.

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a warehouse conveyor system per se, other device, system, and/or method embodiments are also included in such discussions, and vice versa.

Furthermore, various modifications and combinations can be derived from the present disclosure and illustrations, and as such, the following figures should not be considered limiting.

The present technology provides warehousing systems including mobile or stationary workstations, mobile device enclosures and mounting systems, software, communications and data display, including the ability to receive and display information from a variety of host sources, to interact with the data through touch, type or scan, and to return that data with pertinent changes to a host or middleware system.

Computer controlled order filling systems have been developed which assist workers in picking inventory order items. These order filling systems can identify the location and quantity of order items to be picked by a picker during the order filling process. These order filling systems may include a controlling computer or director computing device which may be electrically connected to numerous user interface devices mounted throughout a storage area. The user interface devices can include visual displays that direct the picker to the location of the order item and display the pick quantity of order items. After the specified quantity of the order item has been removed, the picker can confirm through the user interface that an inventory item has been picked. This process may be repeated until the worker has picked the items in the order. Existing warehouse management solutions are typically complex and provide a Graphical User Interface ("GUI") with limited user data interface and exchange capabilities. Further, the existing solutions are not able to maximize picking efficiency.

In one example of the present technology, a warehouse management system can include pick carts, each having an identifier associated therewith. A mobile computing device can be associated with a pick cart based on the identifier and may be associated with one of the pick carts at a time. A director computing device can be in wireless communication with the mobile computing device and can transmit pick instructions to the mobile computing device based on a currently associated pick cart configuration.

The present technology relates to a combination of a mobile cart or a work station and a computing device associable therewith. In one aspect, the computing device may be a touch screen tablet computing device. Other features, such as a tablet enclosure and mount, a graphical user interface application, and host connection to the director computing device may also be implemented to facilitate picking operations. This combination of technologies may provide a mobility enabled data interaction work station usable in a warehouse, storage center, or other storage environment that receives, stores or processes inventory.

Embodiments of the technology bring together disparate technologies to create an effective user experience of using vast amounts of data on warehouse floors without the need for a traditional desktop Personal Computer. This is accomplished using touch screen tablet computers or other such mobile devices, tablet enclosures, tablet mounts (static and swivel), user interface applications, user interface screens, host data connections, middleware processing and host side processing of data.

Referring to FIG. 1, a conventional pick cart 110 is illustrated for picking inventory items for filling an order. For example, the cart may include one or more shelves or surfaces for supporting bins 120 or containers thereon, or simply for supporting picked items placed thereon. Different shelves may support different sized bins for receiving larger quantities of items and/or for receiving physically larger items.

The pick cart can be mobile. As illustrated, the pick cart can include wheels 115 or another suitable mechanism for enabling a picker to move the cart from one location to another. Some pick carts may be motorized while others may be manually moveable upon application of a force by the picker.

Figure 2:
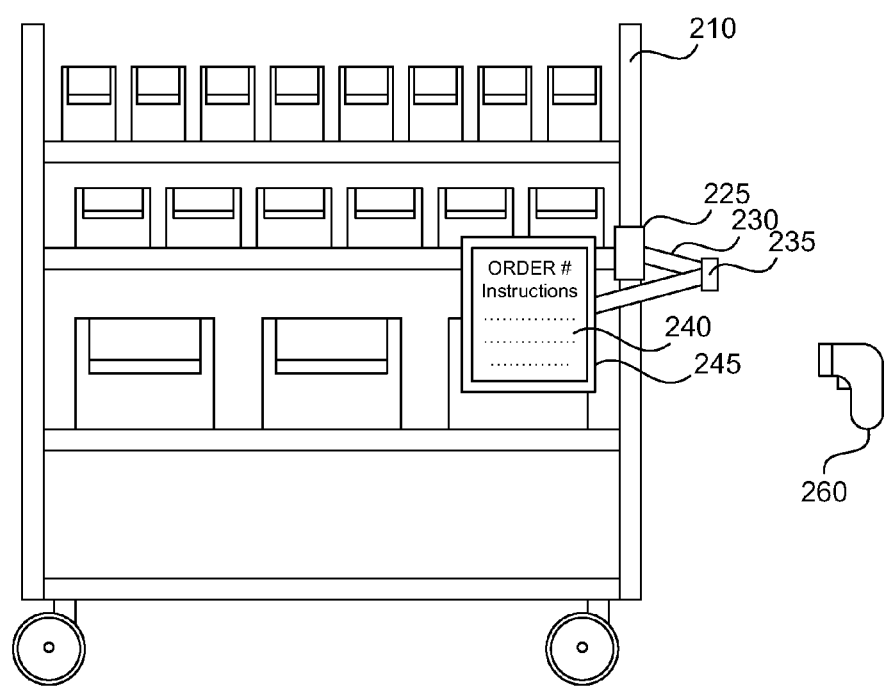
FIG. 2 is a front view of a pick cart with an attached mobile computing device in accordance with an example of the present technology.
Figure 3:
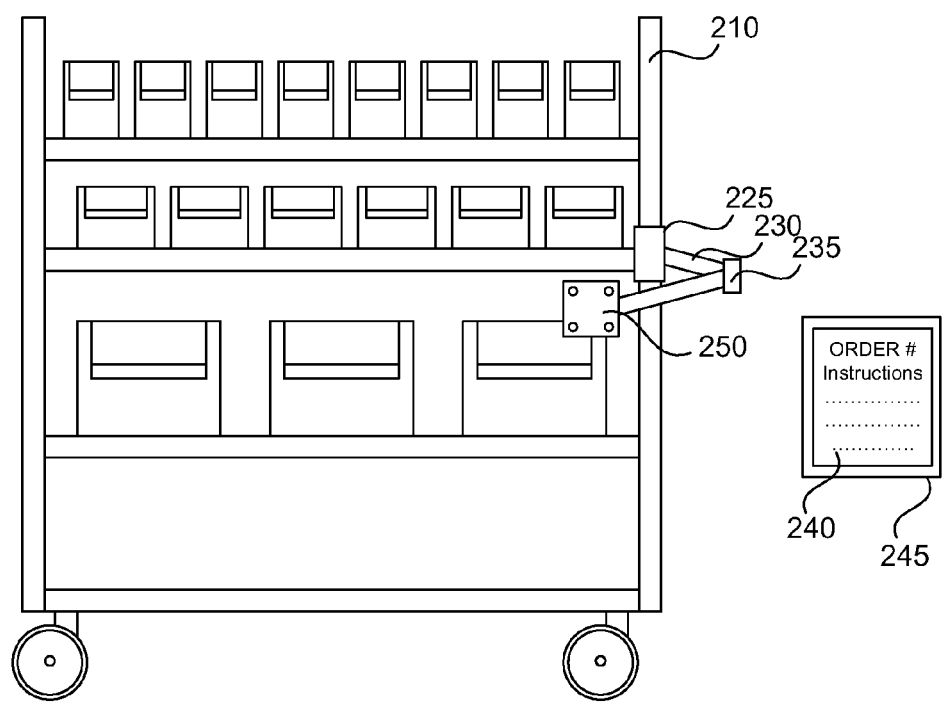
FIG. 3 is a front view of a pick cart with a detached mobile computing device in accordance with an example of the present technology.

Referring to FIGS. 2-3, a pick cart 210 is shown in accordance with another example, wherein the pick cart has a computing device 240 attached thereto, such as a tablet computing device. The computing device may be a mobile computing device, such as a phone, tablet, netbook, notebook, or other suitable device. The mobile device may be detachable from the pick cart or may remain unattached from the pick cart.

In one aspect, the technology is comprised of example components, such as: (i) a mobile pick cart 210 configured to hold inventory and/or provide a work surface and area for warehouse and/or manufacturing tasks, which, in one embodiment, has wheels; (ii) a touch screen computing device 240; (iii) an optional hand held scanner 260 such as a bar code scanner for scanning data (the function of the hand held scanner may optionally be performed by the computing device using, for example, an optical detector or camera of the computing device and software for performing the operations performed by the scanner in the past; (iv) an optional enclosure 245 for the computing device; and (v) an optional mount or bracket 250 (FIG. 3) for mounting the computer to the mobile cart or workstation.

Example implementations of the technology include various combinations of hardware. Such hardware can include, but is not limited to, tablet computers, swivel mounts, stationary mounts, mounts to posts, mounts to tables, pick carts, carts with shelves, work carts, table tops, forklifts, order pickers, man lifts, stock pickers, work stations, manifesting stations, value add work stations, receiving stations, and/or general warehouse vehicles. Designs of the technology include combinations of software, such as software suites, individual apps or applications, open connections to a host, specific connections to a host, middleware software and/or tablet-middleware connections.

Specific non-limiting device examples used by examples of the present technology can include tablet PC's/tablet computing devices 240 (e.g., iPads, Android tablets, Windows tablets, etc.), touchscreen computing devices, cell phone devices, BlueTooth scanners, Wi-Fi scanners, WMSs (Warehouse Management Systems), accounting systems, inventory systems, and so forth.

Examples of the present technology maintain the ability to perform calculations and data changes at device level using the computing device associated with the pick cart, as opposed to previous technologies that could simply display, capture, and/or return data—with little to no user side calculations possible. A warehouse management system according to the present technology may present large amounts of data, including text, tables and/or graphical data, to a user throughout a warehouse through the use of touch screen tablet computers, tablet enclosures, enclosure mounts, custom user interfaces, open data connections and appropriate host side data control.

The computing device 240 associable with the pick cart 210 can be attachable to a bracket 250 (FIG. 3) which may be coupled to the pick cart via a pivoting mechanical arm 230. The mechanical arm may include one or more hinges or pivot points 225, 235 to enable the arm to swivel, bend, extend, retract, fold, etc. Having a pivotable arm supporting the mobile computing device can enable a picker to pivot the mobile computing device to different positions to facilitate picking of items. For example, aisles between warehouse shelves may be narrow and maneuvering the cart into the aisle and/or within the aisle may be difficult or unfeasible. Having a pivot arm coupled to the mobile computing device enables the picker to position the cart to the side of an entrance to the aisle so that the picker can easily enter and exit the aisle, while positioning the mobile computing device such that the picker can view a display screen of the mobile computing device while in the aisle. Having the computing device attached to the pivot arm while picking can free the picker's hands and arms to carry or move items being picked or to use another handheld scanner 260 to verify that a picked item matches a pick instruction displayed on the computing device.

In one aspect, the pivot arm 230 may be rotatably coupled to a corner of the pick cart 210, such as to a vertical post forming a part of the pick cart frame, and may be rotatable around the vertical post within a range from adjacent to a shelf at the front of the pick cart, out and around from the pick cart, and back against a side of the pick cart. The pivot arm may also optionally be configured to pivot upward and downward, and may further be repositionable at different heights on the vertical post or from one position on the pick cart to another position (such as from one vertical post to another vertical post).

The computing device 240 may be housed in a frame 245 attachable to the bracket 250 (FIG. 3) at an end of the pivot arm 230. The bracket may be pivotable or movable with respect to the pivot arm across a wide range of motion in at least one plane (such as from a first orientation with the computing device parallel and adjacent to a first side of the pick arm to a second orientation with the computing device parallel and adjacent to a second, opposite side of the pick arm). The bracket may optionally be pivotable across all planes, such that the computing device may be pivoted upwardly, downwardly, sidewardly, or at an angle with respect to vertical or horizontal directions.

Any portion of the pivot arm 230 and/or bracket 250 may also optionally be rotatable, to enable for example, inversion of vertical orientation. The pivot arm can include one or more hinges between the ends thereof to enable further maneuverability and positionability of the pivot arm.

The mobile computing device 240 may be enclosed in an enclosure or frame 245 attachable to the bracket 250 which is configured to enable horizontal or vertical positioning of the mobile computing device. The enclosure may be configured to enable quick release from the bracket. In one aspect, the enclosure may be configured to attach to a variety of different types, shapes, or sizes of mounting brackets. The enclosure may further be configured to support one or more battery devices for powering the mobile computing device.

Mounting of a computing device to a mobile pick cart can include securing the device physically, securing access to device software, providing flexibility of orientation (e.g., portrait or landscape or other), providing extended battery life of standard devices, and/or providing a quick release for swapping of the computing device.

Software on the computing device 240 can allow display of batch pick information, allow a single item pick, allow order verification, allow order receipt, allow item putaway, allowing location cycle count, allow SKU cycle count, and allow order manifest. Displaying data with an interactive interface can include communication with a central hub (e.g., between a tablet and a data source), Bluetooth device communications (e.g., between a device and a tablet), localized calculations (e.g., at the tablet) which include error management, updating location data, and updating SKU data.

Figure 4:
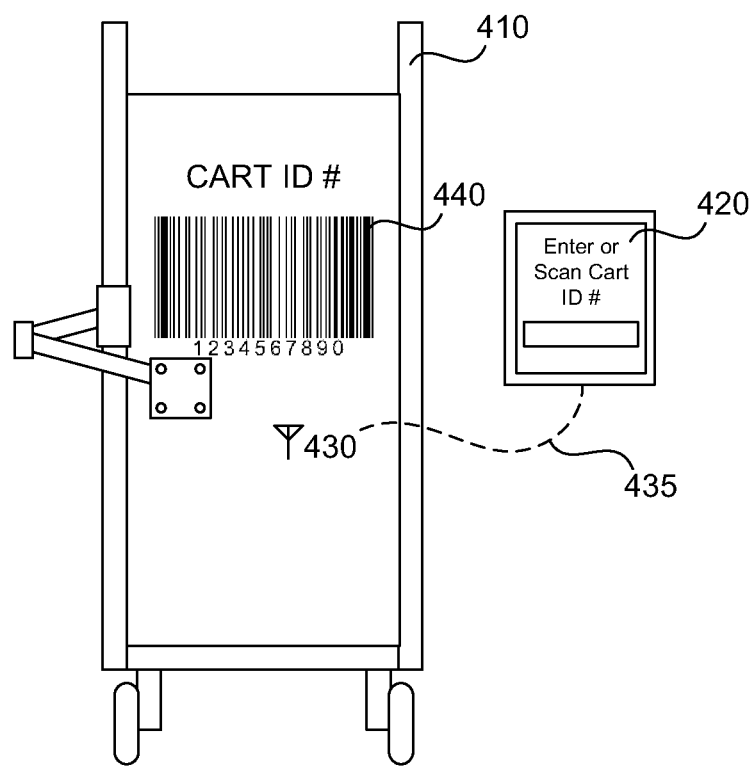
FIG. 4 is a side view of a pick cart and mobile computing device associable with the pick cart using a cart identification number or barcode in accordance with an example of the present technology.

Referring to FIG. 4, a system is shown in accordance with an example of the present technology, wherein one or more pick carts 410 may each have an identifier 440 associated therewith. A mobile computing device 420 can be associated with a pick cart based on the identifier and may be associated with one of the pick carts at a time. The mobile computing device can receive pick instructions based on a currently associated pick cart configuration.

The mobile computing device 420 can be selectively associated with or dissociated from the pick cart 410 based on the identifier 440 associated with the pick cart. The identifier may comprise any of a number of different types of identifiers. For example, the identifier may include a bar code, a UPC (Universal Product Code), a serial number, a QR (Quick Response) code, or any other suitable type of identifier. The association of the pick cart with the mobile computing device can be performed in a number of ways. For example, the mobile computing device may be configured to optically recognize the identifier with an optical detector (such as a camera, for example), such as by capturing an image of the identifier and using any of a number of currently available technologies for optically recognizing codes, characters or the like. As another example, a picker may manually enter a cart identification number into the mobile computing device using an identifier input interface implemented in software on the mobile computing device.

In another example, the mobile computing device 420 may be configured to detect a wireless signal from an emitter 430 on the pick cart, such as a BlueTooth, Wi-Fi, RF (Radio Frequency), NFC (Near Field Communication), or other wireless signal. The mobile computing device may include an appropriate detector for detecting the type of signal emitted from an emitter on the mobile cart. The mobile computing device may also detect the signal from the pick cart as a signal transmitted over a wired connection between the pick cart and the mobile computing device. For example, a data cable 435 or other wired connection may extend from an identifier device on the pick cart and be insertable into an appropriate data port on the mobile computing device.

In one example, the mobile computing device 420 can be used to capture an image of the pick cart, including a configuration of the cart (such as a number and/or arrangement of any shelves, bins, and so forth), and can identify or retrieve a cart identifier based on the detected pick cart configuration.

Figure 5:
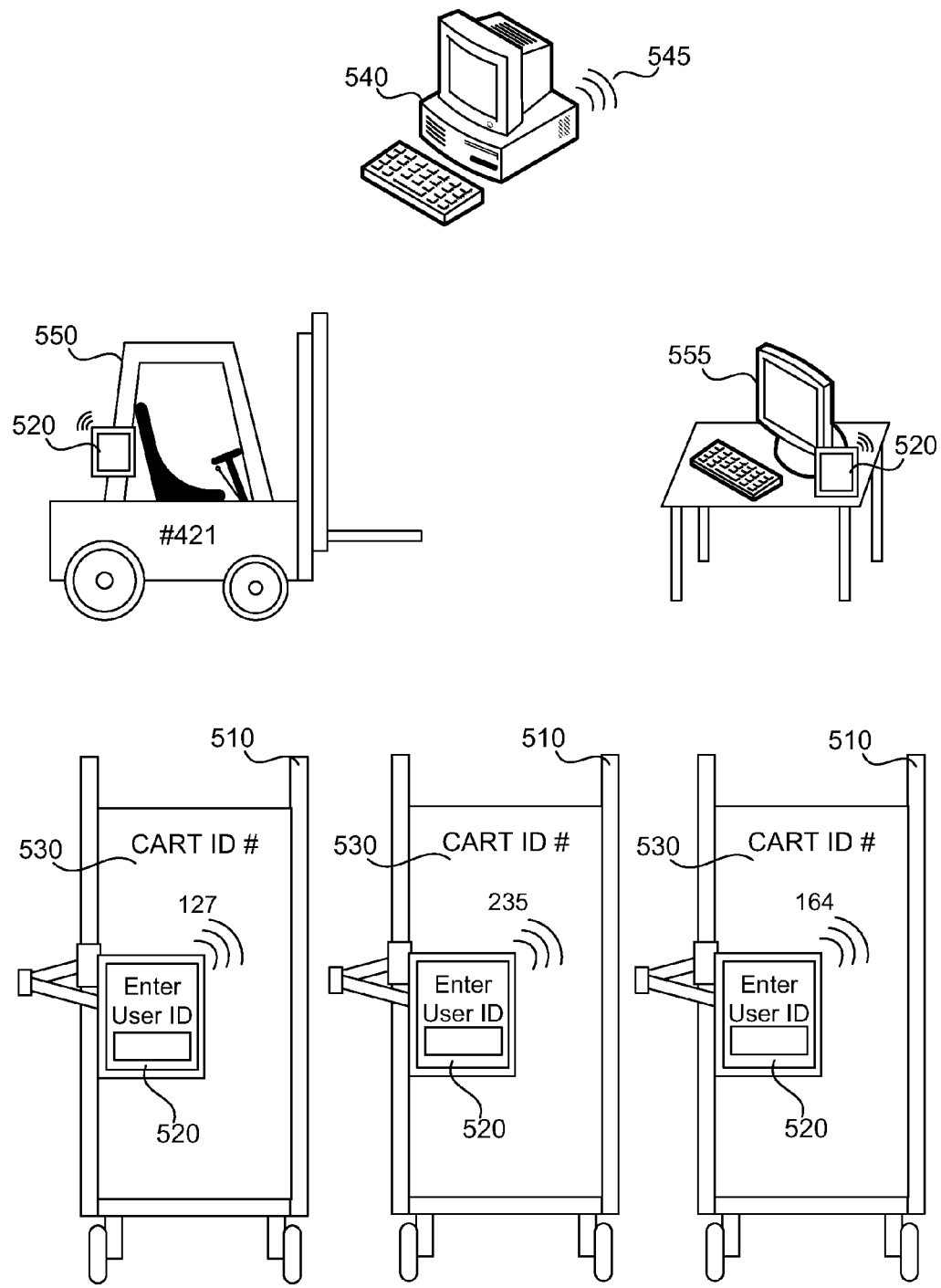
FIG. 5 illustrates a warehouse management system including a director computing device and a plurality of pick carts having mobile computing devices associated therewith in accordance with an example of the present technology.

Reference will now be made to FIG. 5. Each pick cart 510 may have a known configuration, including for example, a number and size of bins, a number of shelves, a height between shelves, a shelf depth, a maximum recommended load capacity, and so forth. The configuration of the pick carts can be associated with an identification 530 of the pick cart, such as an identification number, barcode, etc. The pick cart identifications and configurations can be stored in a cart profile data store accessible by a director computing device 540. The director computing device may provide an interface by which new carts/configurations may be input, by which current carts/configurations may be modified, and by which current carts/configurations may be removed from the system.

Positive identification of a pick cart 510 can enable better planning for picking particular items. For example, a large, heavy-duty cart may be desired for picking large items or a large number of items. Some carts may have different heights, widths, or depths which are better suited to picking particular items, or to entering aisles on which items are located. The director computing device 540 can thus use a variety of information specific to the pick cart and the items to be picked to determine the appropriate pick cart to use for a specific picking task. As another example, the director computing device may assign items to be picked based on a current association between a pick cart and mobile computing device. Cart configurations may be dynamic. In other words, pickers may be enabled to change a cart configuration. In some examples, the director computing device may include instructions to the picker to change the cart configuration in a defined manner before completing pick instructions.

As stated previously, the mobile computing device 520 can be in wireless communication 545 with the director computing device 540 and can receive pick instructions from the director computing device. The pick instructions may be assigned and/or transmitted to mobile computing devices 520 manually or automatically, such as according to predefined assignment rules. Association of the mobile computing device with a specific cart having a known configuration can assist in the flow of instructions from the director computing device because the director computing device can "know" which carts are in use, which are available for association with a mobile computing device, and so forth. GPS or other positional sensing sensors can further be used to submit data to the director computing device so that the director computing device is "aware" of a position of the mobile computing device(s) and/or pick cart(s) at any given time. The positional data can also be used in organizing pick instructions to be sent to pickers. Furthermore, the director computing device can "know" where inventory is, such as what inventory items are on the cart and/or where the cart is located due to the association of the mobile computing device with the cart. When an item is picked and placed on the cart, the user may input completion of the pick into the computing device to enable tracking of the location of the inventory by the director computing device. Also, this may enable the director computing device to query what inventory items are currently on or located with any given pick cart.

As one example use case, a mobile computing device 520 may be associated with a pick cart 510 having a pick cart configuration. The director computing device 540 can transmit pick instructions to the mobile computing device based on the configuration of the currently associated pick cart. Any items to be picked which are incompatible with the pick cart or the picker, due to size, security, or other reasons, may be included in instructions sent to a different mobile device. For example, pick instructions for high security items may be assigned to specific pickers, such as by sending the pick instructions to the mobile computing device 520 associated with the specific picker(s) after identifying the association according to user login information, mobile computing device identification, or the like.

As another example use case, a mobile computing device 520 may be associated with a pick cart 510 having a pick cart configuration. The director computing device 540 can transmit pick instructions to the mobile computing device for the picker to dissociate the mobile computing device from the currently associated pick cart and to re-associate the mobile computing device with a different pick cart, which may be identified by configuration characteristics, explicit identification, and so forth. After re-association with the different pick cart, the picker may proceed to complete pick instructions received from the director computing device. In some examples, multiple carts may have same or similar configurations. If the multiple carts are the same or if the specific configuration of the cart is not important for completing pick instructions, the picker may be enabled to select a different cart independently for completing pick instructions. The association of the picker's mobile computing device with the different cart may indicate to the director computing device that the different cart is to be used to complete the pick instructions.

In another example, picker profile information may be stored in a picker profile data store accessible by the director computing device 540. Picker profile information may include, for example, security clearance, experience, physical stature, and so forth. A picker can log-in to a mobile computing device to be associated with the mobile computing device. Rather than simply distributing pick instructions to mobile devices 520 based on pick cart configurations, the director computing device may further consider picker profile information. For example, if particular items are accessible to pickers with a specific security clearance, pick instructions may be sent to mobile computing devices associated with pickers with the specified security clearance. If items are fragile or otherwise involve particular handling for picking, pickers with a certification or minimal level of experience may receive the picking instructions for such items. If items are located high on a shelf or are above a certain weight, pickers with a minimum height or build may be selected to pick such items.

In one aspect, additional devices may be associated with the mobile computing device 520. For example, a handheld scanning device may be in wireless communication with the director computing device but not currently in direct communication with the mobile computing device. A picker may associate the handheld scanning device with the mobile computing device such that any scanning or other functions performed by the scanning device can be reported to the director computing device 540 and then to the mobile computing device with which the scanning device is associated. Thus, the mobile computing device can confirm to the picker the accuracy of functions performed using the scanning device. The association of the scanning device with the mobile computing device can be performed in a similar fashion as the association of the mobile computing device with the pick cart. In some examples, the scanning device may communicate directly with the mobile computing device.

In one aspect, the mobile computing device 520 may be used as a scanning device in place of traditional handheld scanning devices. A camera, optical detection device, RF detection device, or the like included with the mobile computing device may perform the functions conventionally performed by handheld scanning devices.

Picking instructions may, in some examples, include instructions to use multiple pick carts 510 to pick various items. Thus, a picker may be instructed to pick some items using a first cart and then to switch to another cart to continue picking items. In such an example, currently displayed instructions for the picker may include instructions for the currently associated pick cart or pick cart configuration. Once the instructions for the currently associated pick cart have been completed, the mobile computing device may display instructions for the next pick cart.

The mobile computing device 520 may provide a distal picker mode and a proximal picker mode. For example, in a distal picker mode, the mobile computing device may be configured to display a location and/or item name or number in large text, filling a majority of the display screen, to enable the picker to view the instructions from a distance while picking items and the mobile computing device is attached to the pick cart. Use of a handheld scanner can trigger a change of what is displayed on the mobile computing device. For example, a signal to the mobile computing device may be provided that the handheld scanner indicates the picker has picked the currently displayed item. In a proximal picker mode, smaller text may be provided to display a more complete instruction—such as displaying multiple of the items to be picked or displaying additional information about the current item to be picked. Some information which may be included on the display in the distal or proximal picker modes may include, for example, detailed item information, including graphics, video, drawing and related documentation; warehouse locations; warehouse work stations; warehouse users; picking steps, including graphical instructions, video instructions and/or related documentation; a count of available items; options to update item information/location; tracking information regarding inventory status during a picking process; and/or any user activity during one or more of a receiving process, a put away process, a picking process, a cycle count process, and/or an inventory control process.

In one example, a method of use of the present system may include steps such as: identifying an item, verifying an item, showing details of an item, and/or updating an inventory. When the picker is instructed to perform a put-away option or stocking option for returning an item to a specific location, the method may include one or more of: directing a picker to a location, verifying a location, and/or updating inventory at a location. The picking process may include one or more of: directing a picker to a location, verifying a location, verifying an item, verifying a pick quantity, updating a location quantity, and/or updating a pick task list.

In one aspect, the mobile computing device 520 may track a particular bin on the cart where items are stored, such as by providing instructions to the picker to place the item in the bin and then requesting confirmation that the item has been placed in the instructed bin.

Portions of the systems and methods described herein may be implemented as computer readable program code executed by the processor, the computer readable code being embodied on a non-transitory computer usable medium.

In some examples, the system may be implemented in connection with devices other than pick carts. For example, the mobile computing device 520 may be associable with a forklift 550, a work station 555, man lifts, stock pickers, manifesting stations, value add work stations, receiving stations, general warehouse vehicles and any variety of other types of devices.

Figure 6:
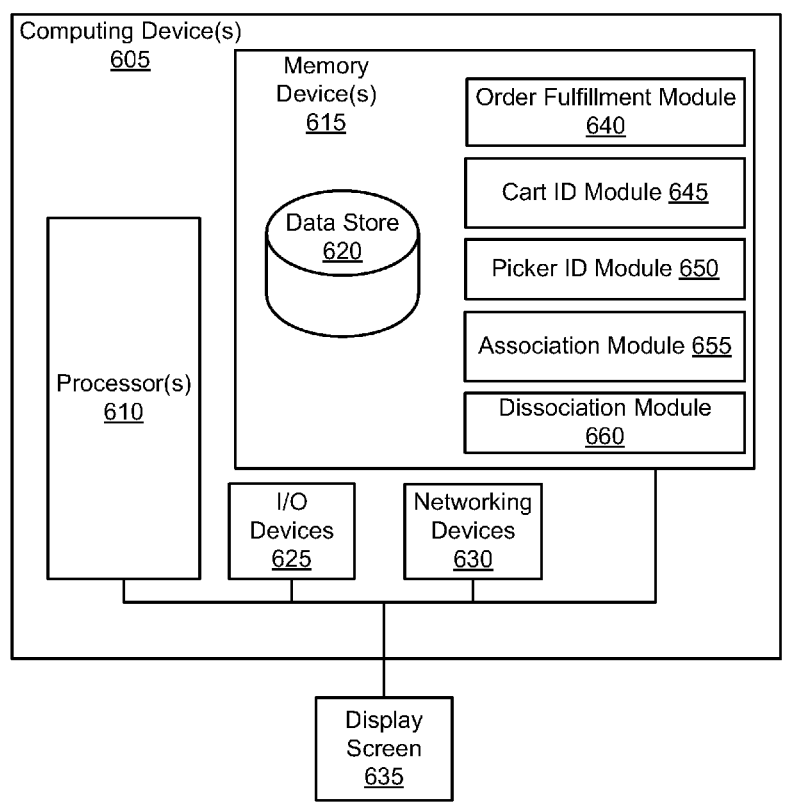
FIGS. 6-7 illustrate warehouse management systems involving computing devices, modules, and data stores in accordance with examples of the present technology.

Referring to FIG. 6, a warehouse management system is shown in accordance with an example of the present technology. FIG. 6 illustrates that a device 605 may be a computing device or computing node that includes hardware processor devices 610, hardware memory devices 615 and Input/Output (I/O) device 620 communication to enable communication between hardware devices and I/O components. Networking devices 625 may also be provided for communication across a network with other nodes of the technology. The network device may provide wired or wireless networking access for the networkable devices. Examples of wireless access may include cell phone network access, Wi-Fi access or similar data network access.

FIG. 6 also illustrates a computing device 605 on which modules 640, 645, 650, 655, 660 of the present technology may execute. The computing device may include one or more processors 610 that are in communication with the memory devices 615. The computing device may include a local communication interface for the components in the computing device. For example, the local communication interface may be a local data bus and/or any related address or control busses as may be desired.

The memory device 615 may contain modules that are executable by the processor(s) 610 and data for the modules. Located in the memory device are modules executable by the processor. For example, the modules may include an order fulfillment module 640 for tracking and organizing order fulfillment processes; a cart ID module 645 for maintaining a database of cart IDs and configurations for identifying a cart when a cart ID is received or detected; a picker ID module 650 for identifying a picker according to an identification number, login, information, or the like for associating the picker with a cart and/or mobile computing device for picking instructions; an association module 655 for associating a mobile computing device with a pick cart and/or for managing or storing information related to associations of mobile computing devices with pick carts; and a dissociation module 660 for dissociating a mobile computing device from a pick cart and/or for editing or removing stored information related to associations of mobile computing devices with pick carts. Other modules may also be present and may, for example, be located in the memory device 615. The modules may execute the functions described earlier. A data store 620 for storing orders, warehouse inventory and other data may also be located in the memory device for storing data related to the modules and other applications along with an operating system that is executable by the processor(s) 610.

Other applications may also be stored in the memory device 615 and may be executable by the processor(s) 610. Components or modules discussed in this description that may be implemented in the form of software using high programming level languages that are compiled, interpreted or executed using a hybrid of the methods.

The computing device may also have access to I/O (input/output) devices 620 that are usable by the computing devices. An example of an I/O device is a display screen 630 that is available to display output from the computing devices 605. Other known I/O device may be used with the computing device as desired. The networking devices may be wired or wireless networking devices that connect to the internet, a LAN, WAN or other computing network.

The components or modules that are shown as being stored in the memory device 615 may be executed by the processor 610. The term "executable" may mean a program file that is in a form that may be executed by a processor. For example, a program in a higher level language may be compiled into machine code in a format that may be loaded into a random access portion of the memory device and executed by the processor, or source code may be loaded by another executable program and interpreted to generate instructions in a random access portion of the memory to be executed by a processor. The executable program may be stored in any portion or component of the memory device. For example, the memory device may be random access memory (RAM), read only memory (ROM), flash memory, a solid state drive, memory card, a hard drive, optical disk, floppy disk, magnetic tape or any other memory components.

The processor 610 may represent multiple processors and the memory 615 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer and similar systems.

Figure 7:
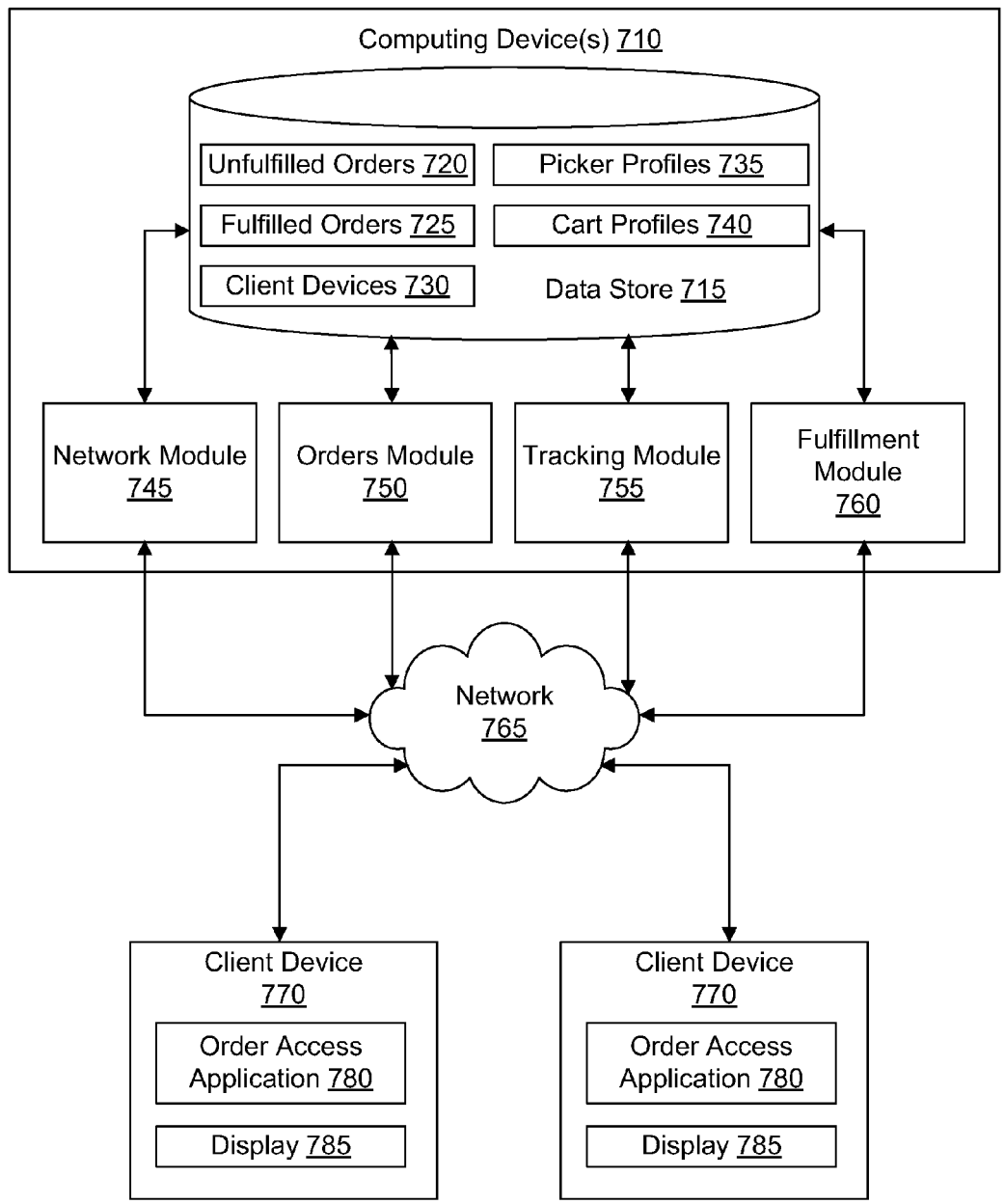

FIG. 7 illustrates another example implementation of the present technology. A warehouse management system may be implemented across multiple computing devices, such as computing device 710 and client device 770 connected via a network 765. For example, a computing device 710 may include a data store 715 and various modules 745, 750, 755, 760 executable by a processor of the computing device 710 for performing various aspects of the present technology. Some examples of the modules may include a network module 745, an orders module 750, a tracking module 755, and a fulfillment module 760.

The data stored in the data store 715 may include, for example, unfulfilled order data 720, fulfilled order data 725, client device data 730 such as identification and/or device information for mobile computing devices 770, picker profile information 735, cart profile information 740, and so forth. The term "data store" may refer to any device or combination of devices capable of storing, accessing, organizing and/or retrieving data, which may include any combination and number of data servers, relational databases, object oriented databases, simple web storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM (Random Access Memory), optical media or hard-drive type media.

The network module 745 may provide for communication of data in the data store 715 between the computing device 710 and the client devices 770. The orders module may facilitate management of data in the data store relating to orders, such as by updating unfulfilled orders 720 and fulfilled orders 725 information. The tracking module 755 can track the status of orders or the picking process and may be configured to provide a report regarding the status. The fulfillment module 760 can manage issuance of picking instructions to fulfill unfulfilled orders, and instructions may be based on one or more of picker profile information, cart profile information, associations between client devices 770 and carts or pickers, and so forth.

The client devices 770 are representative of a plurality of client devices that may be coupled to the network 765. Each client device 770 may comprise, for example, a processor based system such as a computer system. Such a computer system may be embodied in the form of a client computer, a desktop computer, a laptop computer, a mobile device, a hand held messaging device, a set-top box, heads up display (HUD) glasses, a car navigation system, personal digital assistants, cellular telephones, smartphones, set-top boxes, network-enabled televisions, music players, web pads, tablet computer systems, game consoles, electronic book readers or other devices with like capability, including capabilities of receiving and presenting content from a server. Each client device 770 may include a respective display 785. The display 785 may comprise, for example, one or more devices such as cathode ray tubes (CRTs), liquid crystal display (LCD) screens, gas plasma based flat panel displays, LCD projectors, or other types of display devices, etc.

A client device 770 may be configured to execute various applications such as a browser 775 and/or a page or content access application 780 for displaying pick instructions and/or data for useful applications. The browser 775 may be executed by a client device 770, for example, to access and render network pages, such as web pages, or other network content served up by the computing device 710 and/or other servers. The content access application 780 is executed to obtain and render for display content features from the server or computing device 710, or other services and/or local storage media.

In some embodiments, the content access application 780 may correspond to code that is executed in the browser 775 or plug-ins to the browser 775. In other embodiments, the content access application 780 may correspond to a stand-alone application, such as a mobile or desktop application. The client device 770 may be configured to execute applications beyond those mentioned above, such as, for example, mobile applications, email applications, instant message applications, and/or other applications.

Although a specific structure may be described herein that defines server-side roles (e.g., of content delivery service) and client-side roles (e.g., of the content access application), it is understood that various functions may be performed at the server side or the client side.

Next, a general description of the operation of the various components of the networked environment is provided. Pickers at client device 770 access content features through the client device 770 or through content access applications 780 executed in the client device 770. The client device 770 may communicate with a server or director computing device 710 over any appropriate network 765, including an intranet, the Internet, a cellular network, a local area network (LAN), a wide area network (WAN), a wireless data network, or a similar network or combination of networks.

Certain processing modules have been discussed in connection with this technology.

In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The modules that have been described may be stored on, accessed by, accessed through, or executed by a computing device 710. The computing device 710 may comprise, for example, a server computer or any other system providing computing capability. Alternatively, a plurality of computing devices 710 may be employed that are arranged, for example, in one or more server banks, blade racks or other arrangements. For example, a plurality of computing devices 710 together may comprise a cloud computing resource, a grid computing resource, and/or any other distributed computing arrangement. Such computing devices may be located in a single installation or may be distributed among many different geographical locations. For purposes of convenience, the computing device 710 is referred to herein in the singular form. Even though the computing device is referred to in the singular form, however, it is understood that a plurality of computing devices 710 may be employed in the various arrangements described above.

Various applications and/or other functionality may be executed in the computing device 710 according to various embodiments, which applications and/or functionality may be represented at least in part by the modules that have been described. Also, various data is stored in a data store 715 that is accessible to the computing device 710. The data store 715 may be representative of a plurality of data stores as may be appreciated. The data stored in the data store 715, for example, is associated with the operation of the various applications and/or functional entities described. The components executed on the computing device 710 may include the modules described, as well as various other applications, services, processes, systems, engines, or functionality not discussed in detail herein.

In some examples picking options included in a graphical user interface on the mobile computing device may be enabled or disabled based on user identification, pick assignments, association with different picking devices and so forth. For example, where a particular assignment or user identification indicates that the user is to verify accuracy of completed pick instructions, the mobile computing device may be associated with a work station, such as a desk, packaging location, personal computer location, and so forth. In this example, options for verifying the accuracy of the completion of the pick instructions may be presented to the user. In another example where an assignment or user identification indicates that the user is to complete a slotting task, the user may be enabled to associate the mobile computing device with a forklift but not a pick cart, work station or other pick-related device, and options on the mobile computing device may be presented for completing slotting tasks, while other tasks for picking, verifying, and so forth may be disabled and/or made invisible or otherwise unavailable to the user. A user login option may also enable the user to define which tasks or options will be available to the user.

While the foregoing description refers to use of mobile computing devices primarily in terms of association with pick carts, the mobile computing device may more broadly be used with any of a variety of pick platforms. Some examples of other pick platforms include the pick devices described above, such as forklifts, work stations and so forth.

Figure 8:
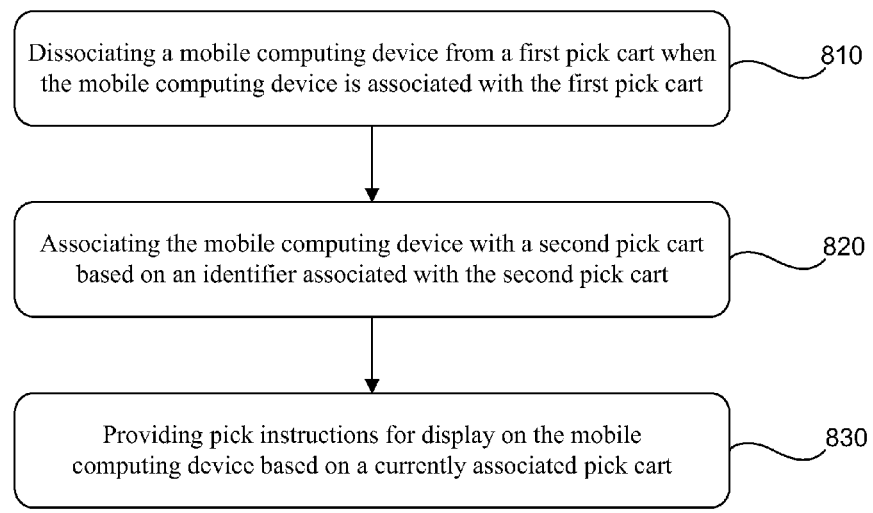
FIG. 8 is a flow diagram of a warehouse management method in accordance with an example of the present technology.

Referring to FIG. 8, a flow diagram of a warehouse management method using a plurality of pick carts is illustrated in accordance with an example of the present technology. The method can include dissociating 810 a mobile computing device from a first pick cart when the mobile computing device is associated with the first pick cart. The mobile computing device can be associated 820 with a second pick cart based on an identifier associated with the second pick cart and pick instructions may be provided 830 for display on the mobile computing device based on a currently associated pick cart configuration.

The method can include physically removing the mobile computing device from the first pick cart and physically positioning the mobile computing device with the second pick cart. The method can also include: identifying a user of the mobile computing device (i.e., the picker) and determining the pick instructions based on the user; and/or identifying a configuration of the currently associated pick cart and determining the pick instructions based on the configuration.

In one aspect, providing the pick instructions for display may provide the pick instructions for fulfilling an individual order using associations of the mobile computing device with multiple of the plurality of pick carts based on identifiers associated with the multiple pick carts.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium or computer readable storage device that includes volatile and non-volatile, removable and non-removable media implemented with any technology for the storage of information such as computer readable instructions, data structures, program modules, or other data. Computer readable storage media include, but is not limited to, RAM (Random-Access Memory), ROM (Read-Only Memory), EEPROM (Electrically Erasable Programmable Read-Only Memory), flash memory or other memory technology, CD-ROM (Compact Disc, Read-Only Memory), DVD (Digital Versatile Discs) or other optical storage, magnetic cassettes, magnetic tapes, magnetic disk storage or other magnetic storage devices or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. By way of example, and not limitation, communication media includes wired media such as a wired network or direct-wired connection, and wireless media such as acoustic, radio frequency, infrared and other wireless media. The term computer readable media as used herein includes communication media.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Reference has been made to the examples illustrated in the drawings, and specific language has been used herein to describe the same. It will nevertheless be understood that no limitation of the scope of the technology is thereby intended. Alterations and further modifications of the elements illustrated herein, and additional applications of the examples as illustrated herein, which would occur to one skilled in the relevant art and having possession of this disclosure are to be considered within the scope of the description.

With the general examples set forth herein, it is noted that when describing a system, or the related devices or methods, individual or separate descriptions are considered applicable to one other whether or not explicitly discussed in the context of a particular example or embodiment. Furthermore, various modifications and combinations may be derived from the present disclosure and illustrations, and as such, the figures should not be considered limiting.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A warehouse management system, comprising:
   a plurality of pick platforms, wherein a first pick platform has a first configuration and a second pick platform has a second configuration different from the first configuration;
   an identifier associated with each pick platform, the identifier being a visual or digital identifier carried by each pick platform, each pick platform having a different identifier than another of the pick platforms;
   a mobile computing device capable of being associated with one of the plurality of pick platforms at a time based on the identifier, the mobile computing device being configured to capture the identifier optically or as a signal using a detector of the mobile computing device to associate the mobile computing device with the one of the plurality of pick platforms; and
   a director computing device in communication with the mobile computing device to receive the association of the mobile computing device with the one of the plurality of pick platforms and configured to select between the first pick platform and the second pick platform based on the first and second configurations and further based on pick instructions, the director computing device being further configured to transmit the pick instructions to the mobile computing device currently associated with the selected first or second pick platform.

2. The system of claim 1, wherein pick platform is a pick cart and the pick instructions comprise instructions for fulfilling an individual order using at least two of the plurality of pick carts according to identifiers associated with the multiple pick carts.

3. The system of claim 1, wherein pick platform is a pick cart and a picker is enabled to fulfill an individual order using at least two of the plurality of pick carts by associating the mobile computing device with the at least two of the plurality of pick carts at different times during fulfillment of the individual order according to identifiers associated with the at least two of the plurality of pick carts.

4. The system of claim 1, wherein the mobile computing device is attachable to and detachable from the pick platform.

5. The system of claim 1, wherein the pick instructions comprise instructions to dissociate the mobile computing device from the currently associated pick platform and to associate the mobile computing device with a different pick platform.

6. The system of claim 1, further comprising a wireless locator system in the mobile computing device configured to identify a current position of the mobile computing device, and wherein the pick instructions are based on the current position.

7. The system of claim 1, further comprising associating the mobile computing device with a user, wherein the pick instructions are determined based on identification of the user.

8. The system of claim 7, further comprising selecting the user based on a security clearance of the user for picking high value items.

9. The system of claim 1, wherein the mobile computing device is configured to optically recognize the identifier associated with the pick platform.

10. The system of claim 1, wherein the mobile computing device is configured to wirelessly obtain the identifier associated with the pick platform.

11. The system of claim 1, wherein each pick platform is a pick cart and each of the plurality of pick carts has an associated cart configuration, and wherein different carts have different cart configurations.

12. The system of claim 1, wherein the mobile computing device is capable of being disassociated with a pick platform based on the identifier, the mobile computing device being disassociated from the currently associated pick cart.

13. A warehouse management system, comprising:
    a plurality of pick platforms:
    an identifier associated with each pick platform, the identifier being a visual or digital identifier carried by each pick platform, each pick platform having a different identifier than another of the plurality of pick platforms:
    a director computing device in communication with a mobile computing device to receive the association of the mobile computing device with a first pick platform of the plurality of pick platforms and configured to:
    dissociate the mobile computing device from the first pick platform when the mobile computing device is associated with the first pick platform;
    associate the mobile computing device with a second pick platform based on the identifier associated with the second pick platform, wherein the identifier of the second pick platform is captured optically or aa a signal using a detector of the mobile computing device;
    identify a configuration of a currently associated pick platform;
    determine pick instructions based on the configuration; and
    provide pick instructions for display on the mobile computing device associated with the pick platform.

14. The system of claim 13, further comprising physically removing the mobile computing device from the first pick platform and physically positioning the mobile computing device with the second pick platform.

15. The system of claim 13, wherein pick platform is a pick cart, the method further comprising providing the pick instructions for fulfilling an individual order using associations of the mobile computing device with multiple of the plurality of pick carts based on identifiers associated with the multiple pick carts.

16. The system of claim 13, further comprising identifying a user of the mobile computing device and determining the pick instructions based on the user.

17. A warehouse management system, comprising:
- a plurality of pick platforms;
- an identifier associated with each pick platform, the identifier being a visual or digital identifier carried by each pick platform, each pick platform having a different identifier than another of the plurality of pick platforms;
- a mobile computing device capable of being associated with one of the plurality of pick platforms at a time based on the identifier, the mobile computing device being configured to capture the identifier optically or as a signal using a detector of the mobile computing device to associate the mobile computing device with the one of the plurality of pick platforms, the mobile computing device further comprising an association module configured to associate the mobile computing device with the one of the plurality of pick platforms; and
- wherein pick instructions for display on the mobile computing device are provided based on a configuration of a currently associated pick platform.

18. The system of claim 17, further comprising a disassociation module configured to disassociate the mobile computing device from the currently associated pick platform.

19. The system of claim 1, wherein the first and second configurations differ in a number or size of shelves or bins carried by the pick platform.

* * * * *